United States Patent [19]
Moore et al.

[11] Patent Number: 5,953,336
[45] Date of Patent: Sep. 14, 1999

[54] METHOD AND APPARATUS FOR SOURCE RATE PACING IN AN ATM NETWORK

[75] Inventors: Mark Justin Moore; Gavin J. Stark, both of Cambridge, United Kingdom

[73] Assignee: Virata Limited, Cambridge, United Kingdom

[21] Appl. No.: 08/692,252

[22] Filed: Aug. 5, 1996

[51] Int. Cl.$^6$ .................................................. H04L 12/56
[52] U.S. Cl. ......................... 370/395; 370/412; 370/468
[58] Field of Search .................................. 370/230, 232, 370/239, 351, 352, 389, 392, 395, 412–419, 420, 428, 429, 463, 462, 458, 459, 461, 465, 437, 498

[56] References Cited

U.S. PATENT DOCUMENTS

| | | | |
|---|---|---|---|
| 4,423,507 | 12/1983 | Roger et al. | 370/449 |
| 5,068,849 | 11/1991 | Tanaka | 370/509 |
| 5,179,556 | 1/1993 | Turner | 370/233 |
| 5,241,536 | 8/1993 | Grimble et al. | 370/416 |
| 5,311,513 | 5/1994 | Ahmadi et al. | 370/230 |
| 5,390,176 | 2/1995 | Schoute | 370/395 |
| 5,390,184 | 2/1995 | Morris | 370/399 |
| 5,392,280 | 2/1995 | Zheng | 370/353 |
| 5,422,888 | 6/1995 | Weinkop | 370/412 |
| 5,463,620 | 10/1995 | Sriram | 370/412 |
| 5,570,355 | 10/1996 | Dail et al. | 370/352 |
| 5,594,723 | 1/1997 | Tibi | 370/396 |
| 5,638,371 | 6/1997 | Raychaudhuri et al. | 370/347 |
| 5,648,958 | 7/1997 | Counterman | 370/458 |
| 5,696,764 | 12/1997 | Soumiya et al. | 370/395 |
| 5,712,851 | 1/1998 | Nguyen et al. | 370/399 |
| 5,751,709 | 5/1998 | Rathnavelu | 370/395 |

FOREIGN PATENT DOCUMENTS 0 596 624 A2  5/1994   European Pat. Off. .
0 618 749 A1  10/1994  European Pat. Off. .

OTHER PUBLICATIONS

Integrated Device Technology, Inc., "IDT77201 155 MBps ATM SAR Controller Data Sheet," Dec. 1994.

Mercankosk G. et al.: "Multiplexing Spacer Outputs on Cell Emissions," Proceedings of Infocom '95—Conference on Computer Communications, Fourteenth Annual Joint Conference of the IEEE Computer and Communications Societies, Boston Apr. 2–6, 1995, vol. 3, Apr. 2, 1995, Institute of Electrical and Electronics Engineers, pp. 49–55.

Chipalkatti R. et al.: "Scheduling Policies for Real–Time and Non–Real–Time Traffic in a Statistical Multiplexer," Technology: Emerging or Converging?, Ottawa, Apr. 23–27, 1989, vol. 3, Apr. 23, 1989, Institute of Electrical and Electronics Engineers, pp. 774–783.

*Primary Examiner*—Douglas W. Olms
*Assistant Examiner*—Seema S. Rao
*Attorney, Agent, or Firm*—Pennie & Edmonds LLP

[57] ABSTRACT

A method and apparatus for scheduling the transmission of cells onto an network, or other packet switching network, is disclosed. The central feature of the scheduling mechanism is a multi-functional timing ring which accommodates both preallocated static scheduling for use with CBR and real-time VBR virtual circuits, and dynamic scheduling for use with ABR, UBR, and non-real time VBR virtual circuits. The timing ring, in which cell transmissions are defined as actions, is processed sequentially in a burst fashion. Static actions are always performed at their allocated time intervals, so fixed transmission intervals can be guaranteed for CBR and real-time VBR traffic. Dynamic actions are moved from the timing ring to a latent queue, which permits dynamic actions to be performed during their scheduled time slot or during the first available time slot thereafter. This mechanism permits ABR and non-real-time VBR traffic contracts to be maintained.

55 Claims, 10 Drawing Sheets

METHOD AND APPARATUS FOR SOURCE RATE PACING IN AN ATM NETWORK

TECHNICAL FIELD

The present invention relates generally to data communication networks and, more particularly, to transmission rate control mechanisms for use in asynchronous transfer mode networks.

BACKGROUND OF THE INVENTION

Asynchronous Transfer Mode ("ATM") is an emerging packet switching network technology designed to provide service for a wide variety of applications such as voice, video and data. Originally proposed for use in the Broadband Integrated Services Digital Network ("B-ISDN") by the International Telegraph and Telephone Consultative Committee ("CCITT"), now reorganized as the Telecommunications Standardization Sector of the International Telecommunication Union ("ITU-T"), ATM is presently moving beyond the wide area network setting into the private network arena as a platform for local area networks ("LANs") with multimedia capabilities. ATM is now well known in the art and is described in various references. E.g., Martin de Prycker, *Asynchronous Transfer Mode: Solution for Broadband ISDN* (2nd Ed., Ellis Horwood Ltd., West Sussex, England, 1993).

In an ATM network, as defined by the CCITT standards, information is carried in packets of fixed size, specified for B-ISDN as 53 bytes or octets, called cells. These cells are individually labelled by addressing information contained in the first 5 bytes (octets) of each cell. Although ATM evolved from Time Division Multiplexing concepts, cells from multiple sources are statistically multiplexed into a single transmission facility. Cells are identified by the contents of their headers rather than by their time position in the multiplexed stream. A single ATM transmission facility may carry hundreds of thousands of ATM cells per second originating from a multiplicity of sources and travelling to a multiplicity of destinations.

ATM is a connection-oriented technology. Rather than broadcasting cells onto a shared wire or fiber for all network members to receive, a specific routing path through the network, called a virtual circuit, is set up between two end nodes before any data is transmitted. Cells identified with a particular virtual circuit are delivered to only those nodes on that virtual circuit.

The backbone of an ATM network consists of switching devices capable of handling the high-speed ATM cell streams. The switching components of these devices, commonly referred to as the switch fabric, perform the switching function required to implement a virtual circuit by receiving ATM cells from an input port, analyzing the information in the header of the incoming cells in real-time, and routing them to the appropriate destination port. Millions of cells per second need to be switched by a single device.

Importantly, this connection-oriented scheme permits an ATM network to guarantee the minimum amount of bandwidth required by each connection. Such guarantees are made when the connection is set-up. When a connection is requested, an analysis of existing connections is performed to determine if enough total bandwidth remains within the network to service the new connection at its requested capacity. If the necessary bandwidth is not available, the connection is refused.

In order to achieve efficient use of network resources, bandwidth is allocated to established connections under a statistical multiplexing scheme. Therefore, congestion conditions may occasionally occur within the ATM network resulting in cell transmission delay or even cell loss. To ensure that the burden of network congestion is placed upon those connections most able to handle it, ATM offers multiple grades of service. These grades of service support various forms of traffic requiring different levels of cell loss probability, transmission delay, and transmission delay variance, commonly known as delay jitter. It is known, for instance, that many multimedia connections, e.g., video streams, can tolerate relatively large cell losses, but are very sensitive to delay variations from one cell to the next. In contrast, traditional forms of data traffic are more tolerant of large transmission delays and delay variance, but require very low cell losses. This variation in requirements can be exploited to increase network performance.

The ATM Forum, an organization of networking vendors, has standardized four of these grades of service, or classes of virtual circuits: constant bit rate ("CBR") circuits, variable bit rate ("VBR") circuits, available bit rate ("ABR") circuits and unspecified bit rate ("UBR") circuits. These four categories define the qualities of service available to a particular connection, and are selected when a connection is established.

A CBR virtual circuit is granted a permanent allocation of bandwidth along its entire path. The sender is guaranteed a precise time interval, or fixed rate, to send data, corresponding to the needed bandwidth, and the network guarantees to transmit this data with minimal delay and delay jitter. A CBR circuit is most appropriate for real-time video and audio multimedia streams which require network service equivalent to that provided by a synchronous transmission network. From the perspective of the source and destination, it must appear as if a virtual piece of wire exists between the two points. This requires that the transmission of each cell belonging to this data stream occur at precise intervals.

A VBR virtual circuit is initially specified with an average bandwidth and a peak cell rate. This type of circuit is appropriate for high priority continuous traffic which contains some burstiness, such as compressed video streams. The network may "overbook" these connections on the assumption that not all VBR circuits will be handling traffic at a peak cell rate simultaneously. However, although the transmission rate may vary, applications employing VBR service often require low delay and delay jitter.

An ABR virtual circuit, sometimes referred to as connection-oriented data traffic, is appropriate for network connections with uncertain requirements for throughput and delay, such as general data traffic. Currently, ABR circuits are specified with a bandwidth range, defined by a minimum bandwidth and a maximum bandwidth. It is contemplated that the actual transmission bandwidth within this range will be dynamically negotiated with the network using some form of flow control. See Flavio Bonomi and Kerry W. Fendick, "The Rate-Based Flow Control Framework for the Available Bit Rate ATM Service," *IEEE Network*, March/April 1995, pp. 25–39.

A UBR virtual circuit, sometimes referred to as connectionless data traffic, is employed for the lowest priority data transmission; it has no specified associated bandwidth. The sender may send its data as it wishes, but the network makes no guarantee that the data will arrive at its destination within any particular time frame. This service is intended for applications with minimal service requirements, e.g., file transfers submitted in the background of a workstation.

A particular end-node on the network may have many virtual circuits of these varying classes open at any one time.

The network interface at the end-node is charged with the task of scheduling the transmission of cells from each of these virtual circuits in some ordered fashion. At a minimum, this will entail pacing of cells from CBR circuits at a fixed rate to achieve virtual synchronous transmission. Additionally, some form of scheduling may be implemented within some or all of the switches which form the ATM network. Connections which have deviated from their ideal transmission profile as a result of anomalies in the network can be returned to an acceptable service grade.

At least two concerns are implicated in this scheduling. First, CBR traffic must be transferred at the necessary fixed rate with little or no delay jitter. Second, ideally VBR and ABR traffic should be transmitted in a manner as near as possible to their defined transfer patterns and no connection should be permitted to exceed its allocated bandwidth or peak cell rate. Although ATM networks possess other mechanisms for dealing with congestion control, adherence to the traffic contract by a source node is an important factor in overall network efficiency. See Dimitri Bertsekas & Robert Gallager, Data Networks, pp. 138–39 (2nd Ed., Prentice Hall, Englewood Cliffs, N.J., 1992).

Prior art systems exist which handle the relatively simple task of scheduling CBR traffic for transmission onto an ATM network, but these systems typically perform no scheduling of VBR and ABR traffic. For example, U.S. Pat. No. 5,390,184 to Morris discloses a scheduling mechanism for use within an ATM switch. CBR traffic is scheduled using a circular buffer containing slots corresponding to the time to transmit a single cell. Unlike VBR or ABR circuits, the bandwidth, and thus the proper cell pacing, of CBR circuits is predefined. Therefore, slots in the circular buffer are statically reserved when a CBR connection is established. The scheduler advances through the circular buffer transmitting CBR cells when a reserved slot is detected. No scheduling of other forms of traffic is performed, rather waiting VBR/ABR/UBR cells are simply transmitting during time slots not allocated for CBR traffic. Systems such as these achieve proper pacing of synchronous data streams, but do not serve to maintain VBR/ABR data streams in compliance with their negotiated traffic contracts.

The lack of a scheduling mechanism for VBR and ABR circuits within an end-node network interface, places a burden upon applications themselves to generate data at appropriate rates for the network implementation. Requiring applications to perform pacing of VBR/ABR streams may be permissible when such applications have been designed with an ATM network connection in mind. However, such solutions are increasingly unacceptable as ATM moves into the LAN setting. Applications designed for conventional LAN technologies cannot be conveniently adapted to produce data under defined pacing conditions; rather, these applications are likely to transmit data without concern for network congestion conditions. If no pacing of these streams is performed, congestion caused by bursty VBR/ABR streams may impair network performance unless the network itself takes other measures to police transmissions. Of course, a simple method to prevent such network congestion is to request an amount of bandwidth much greater as that which can be reasonably expected to be required at any time by a particular application. This solution, however, leads to an underutilization of the network and an inefficient allocation of resources.

Therefore, there persists a need for a cell pacing mechanism capable of producing uniform transmission of ABR, VBR and UBR data streams, as well as CBR streams. Such a system would provide fixed rate pacing of CBR streams while simultaneously policing and shaping VBR, ABR and UBR data traffic.

SUMMARY OF THE INVENTION

The present invention relates to transmission apparatus for scheduling the transmission of packets onto an ATM, or other packet switching, network. The apparatus comprises a timing ring containing entries dynamically allocated for the transmission of packets of virtual circuits, typically ABR, UBR and non-real time VBR circuits. An entry on the timing ring represents an available time slot for transmission of a single cell or packet. The apparatus further comprises a processor for sequentially processing the entries on the timing ring to transmit particular packets or cells onto the network during their scheduled time slot or the first available time slot thereafter. When a dynamically allocated entry for a particular virtual circuit is processed, the next transmission of a packet on that virtual circuit is scheduled by dynamically allocating another entry on the timing ring. The timing ring may also comprise entries statically preallocated for the transmission of packets of other virtual circuits, typically CBR and real-time VBR circuits, According to another aspect, the present invention is directed to a method for scheduling the transmission of cells or packets in an ATM, or other packet switching, network. The method comprises the steps of dynamically allocating entries on a timing ring for scheduling transmission of packets of variable rate virtual circuits, typically ABR, UBR and non-real time VBR circuits. An entry on the timing ring represents an available time slot for transmission of a single packet. The method further comprises processing the entries on the timing ring sequentially to transmit particular packets onto the network during their scheduled time slot or the first available time slot thereafter, and then dynamically allocating new entries to schedule the transmission of the next packet for each virtual circuit. The method may also comprise the step of preallocating entries on the timing ring for scheduling transmission of packets of fixed-rate virtual circuits, typically CBR or real-time VBR circuits.

The preferred embodiment of the present invention is essentially a hybrid of two related scheduling mechanisms: static and dynamic scheduling. The use of these two mechanisms in combination permits trade-offs between flexibility and performance in the scheduling and transmission of cells and packets of various traffic classes. In this manner, packets of fixed-rate CBR and real-time VBR circuits are transmitted at fixed intervals as required by these connections, while packets of variable-rate ABR, VBR and UBR circuits are transmitted in compliance with their negotiated traffic contracts.

BRIEF DESCRIPTION OF THE DRAWINGS

A more complete understanding of the invention may be obtained by reading the following description in conjunction with the appended drawings in which like elements are labeled similarly and in which.

DETAILED DESCRIPTION OF THE INVENTION

In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Furthermore, although what is described herein is a transmission pacing mechanism for use in ATM networks, it should be understood that the present invention is in no way limited in applicability to ATM networks as defined by the CCITT. Rather, one skilled in the art will recognize that the invention described herein may be employed in a wide variety of packet switching networks. For examples of some alternative networks see de Prycker, pp. 50–58.

Figure 1:
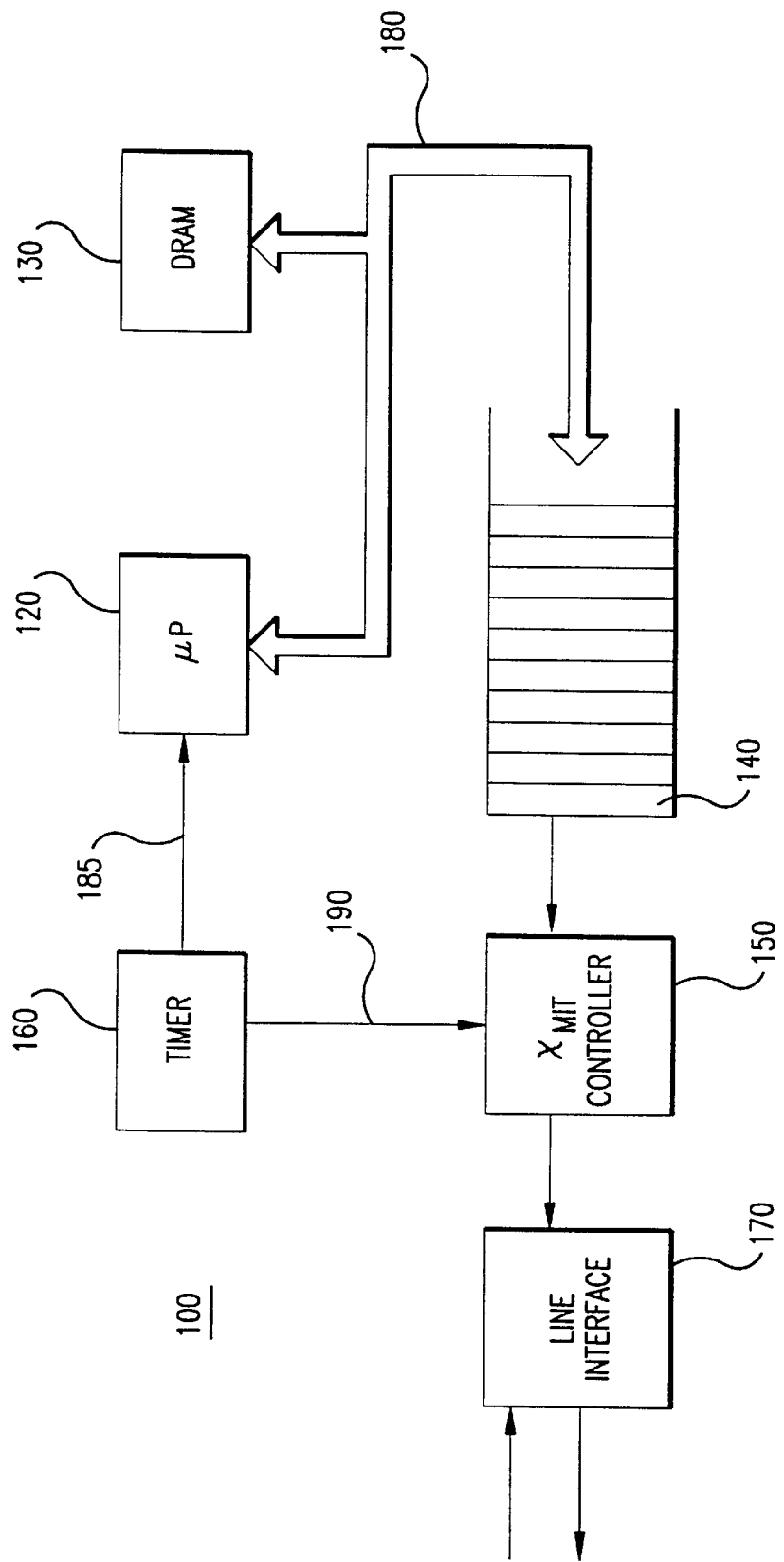
FIG. 1 is a functional block diagram of an embodiment of a transmission pacing mechanism constructed in accordance with the principles of the present invention.

A block diagram of a pacing mechanism 100 constructed in accordance with the principles of the present invention is shown in FIG. 1. Pacing mechanism 100 comprises a microprocessor 120, DRAM memory 130, first-in-first-out (FIFO) transmit buffer 140, transmission controller 150, timer 160 and network line interface 170. Microprocessor 120, DRAM 130 and FIFO buffer 140 are interconnected via data bus 180.

Microprocessor 120 may be, for example, a commercially available RISC single-chip microprocessor such as the ARM610, manufactured by Advanced RISC Machines of Cambridge, England, operating at 32 MHz. Transmission controller 150 represents a block of control logic, the attributes and functionality of which will be described below. This logic may be implemented with discrete components, gate arrays, or Application Specific Integrated Circuits (ASICs) depending on the requirements of the particular implementation. The actual composition of network line interface 170, as will be recognized by the skilled artisan, depends upon the physical medium from which the ATM network is constructed. For example, UTP 802.4 Token Ring components may be employed for use with a 25.6 Mb/s ATM physical layer. Timer 160, DRAM 130 and FIFO buffer 140 may be selected from a wide variety of standard components known to those of ordinary skill in the art.

Figure 2A:
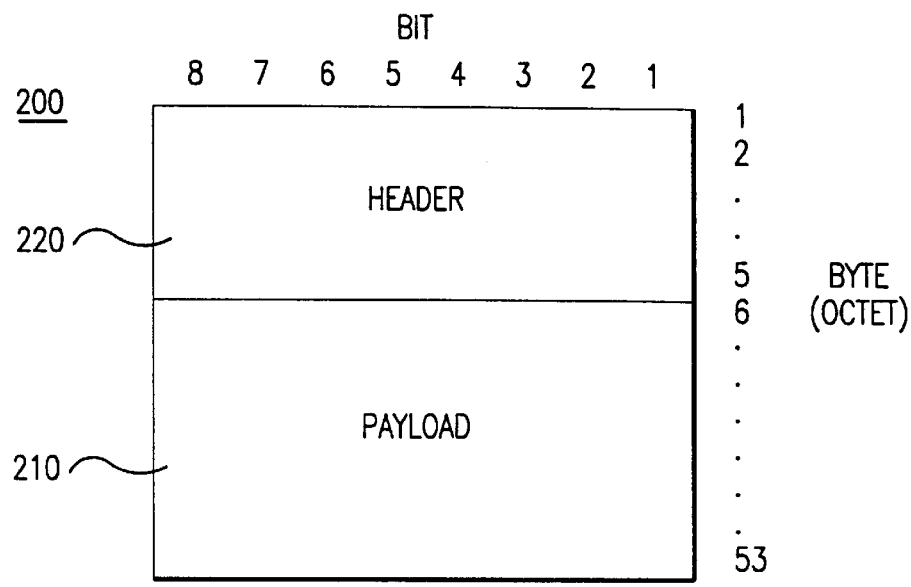
FIG. 2A is a diagram of an ATM cell as defined by the CCITT.

Various bits in the header of the ATM cell are used in carrying out the preferred embodiment of the following present invention. As an aid to understanding the invention, a description of a typical ATM cell is as follows. FIG. 2A shows the format of an ATM cell 200 as defined in CCITT Recommendation I.361. This format, adopted for use in B-ISDN and other wide-area networks, specifies a cell of 53 bytes (octets): an information field or payload 210 of 48 bytes (octets) which contains the user information which is the object of the transmission and a cell header 220 of 5 bytes (octets).

Figure 2B:
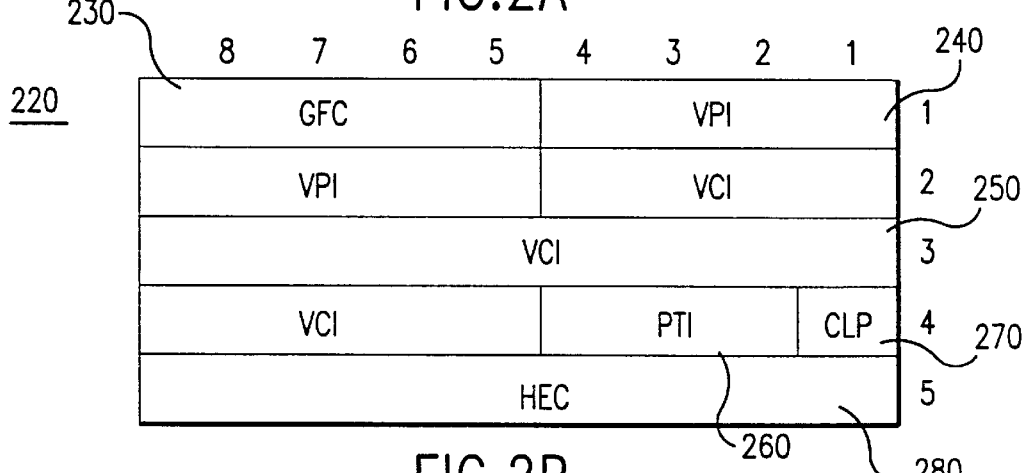
FIG. 2B is a diagram of an ATM cell header at the User-Network Interface as defined by the CCITT.

Cell header 220, or simply "header", is used for transmitting a variety of control information regarding the instant cell. FIG. 2B shows the structure of this header at the User Network Interface (UNI), that is the interface between an end-user device and an ATM switch. Here, the header is made up of a Generic Flow Control field 230 for specifying information which may be used to control traffic flow at the user-network interface, a VPI (virtual path identifier) 240, a VCI (virtual circuit identifier) 250, a payload type 260 which provides information regarding the type of information contained in the payload area 210 of the cell, a cell loss priority bit 270 for setting the priorities relating to the abandonment of the cell during overload conditions, and a Header Error Control field 280 which contains an error control check byte for the previous four bytes (octets) in the header 220.

Figure 2C:
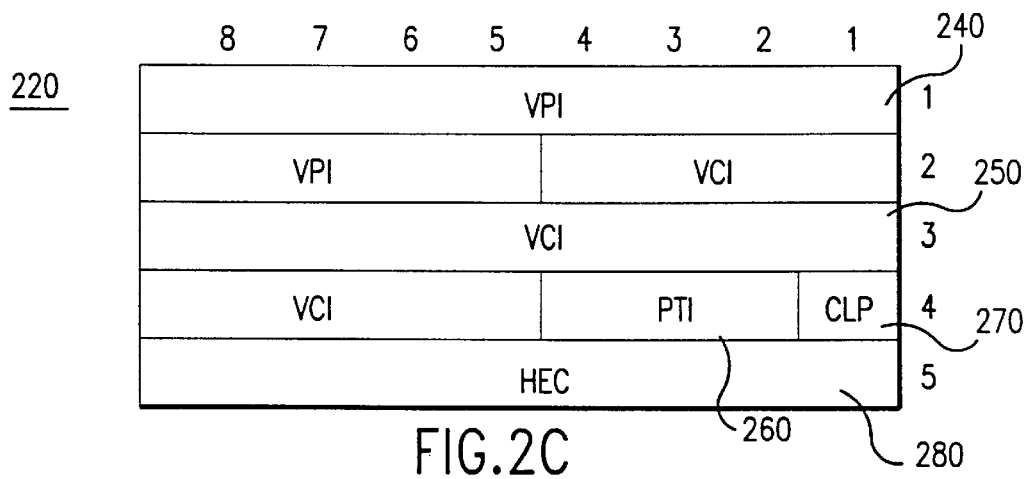
FIG. 2C is a diagram of an ATM cell header at the Network-Network Interface as defined by the CCITT.

FIG. 2C shows the format of header 220 at the Network-to-Network Interface (NNI), the interface between network switches. This header structure is identical to the structure at the UNI except the Generic Flow Control (GFC) field 230 is replaced with four additional bits of VPI 240. ATM networks do not provide for flow control of the type which is implemented in some packet networks and ATM networks have no facility to store cells over a long period of time. Therefore, inside an ATM network there is no need for generic flow control. GFC 230 is defined in the UNI to provide header space for end-node processing of cells. GFC 230 can be used by an end-node for any purpose, and GFC 230 is employed by the present invention, as described below. Thus, within the NNI, GFC 230 may be eliminated in favor of an expanded VPI 240. For more information regarding standard ATM cell formats see de Prycker, pp. 124–28. One skilled in the art will recognize that the cell format described herein represents only one standard cell format and that alternative cell formats and sizes may be employed in conjunction with the present invention.

The preferred embodiment of the present invention is a hybrid implementation of two related scheduling mechanisms. The first, static cell scheduling, is primarily suited, although not constrained, to uniform rate cell pacing as required by CBR and real-time VBR traffic classes. The second, dynamic cell scheduling, is directed to variable rate cell pacing requirements, as defined for ABR, UBR and non-real-time VBR traffic classes. As will be discussed below in the context of alternate embodiments, either mechanism may be used in isolation. However, the use of the two mechanisms in combination permits appropriate trade-offs between flexibility and run-time performance for most network implementations.

Figure 3:
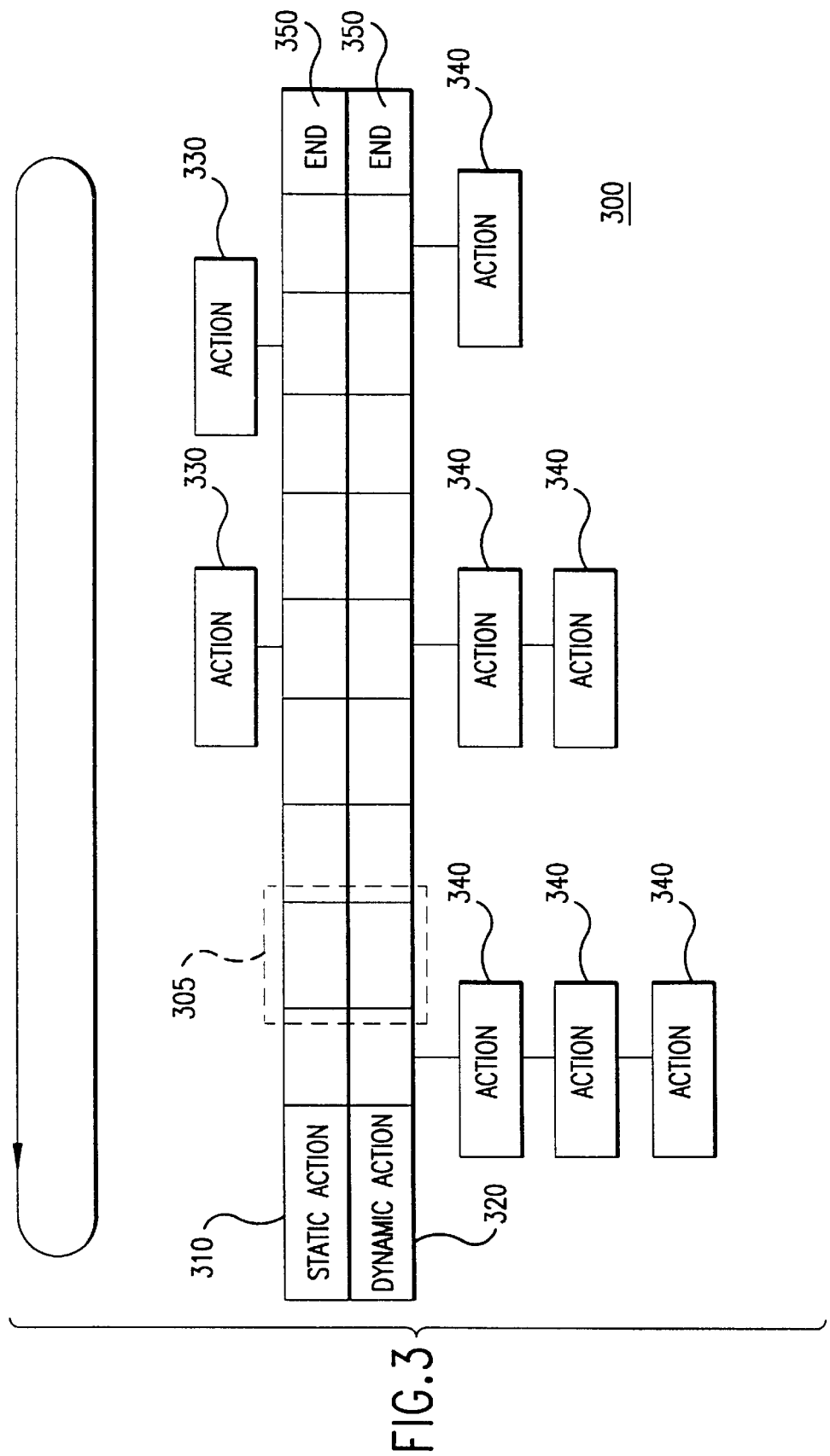
FIG. 3 is an illustration of the timing ring employed in the pacing mechanism of FIG. 1.

The operation of the present invention centers around a "timing ring," a conceptual diagram of which is shown in FIG. 3. Although simple timing rings, also known as slot reservation controllers, have been employed previously in prior art scheduling mechanisms, the ring employed in the present invention is a sophisticated implementation designed to handle both static and dynamic scheduling simultaneously.

Timing ring 300 is shown in FIG. 3 as a linear table for convenience, but it is properly envisioned as circular. As discussed below, processing of END marker 350 will result in looping by the pacing algorithm to the front of timing ring 300. Each entry 305 on timing ring 300 represents an available cell transmission slot and corresponds to the transmission time for one ATM cell in the current network implementation. Entry 305 is composed of two fields: a static action 310 and a dynamic action 320. Together these fields define which "actions," normally cell transmissions, are to be performed during that time slot, and what actions may be performed subsequently. Those of ordinary skill in the art will recognize that although a single timing ring 300 is employed in the preferred embodiment of the present invention, a pair of parallel timing rings, one for static actions and another for dynamic actions, may also be used. Because both fields must be read for each time interval, however, a single ring implementation is more efficient.

Each action field 310, 320 physically contains either a NULL pointer or an address pointer to a data structure, described below, which is stored in DRAM 130 and which defines an action to be taken during that time interval. The NULL pointer indicates that the time slot has not been allocated for the particular scheduling mechanism, static or dynamic, and that no action need be performed. During a single time slot either the static or dynamic field, or both, may contain pointers to action data structures.

The static fields 310 are employed to pace the transmission of CBR and VBR virtual circuits which require transmission of cells at precise time intervals. These fields are preallocated for particular virtual circuits at connection set-up time, or when the quality of service parameters for a given virtual circuit are altered by the network. By preallocating time slots for a particular circuit at precise integral intervals, transmission of cells onto the network containing delay sensitive data can be achieved with a guaranteed maximum delay jitter.

For statically allocated transmissions, it will recognized that the length of timing ring 300, that is, the number of time slots in the ring, is determined by the interface speed and the desired timing resolution. As the size of timing ring 300 increases, the timing resolution increases, but at the expense of memory needed to store timing ring 300. If the minimum service bandwidth (MSB) for the network implementation is known, the minimum size (N) in time slots of timing ring 300 may be calculated as follows $$N = \frac{TMB}{MSB}$$

where TMB represents the overall total bandwidth of the transmission medium.

As shown in FIG. 3, only one static action 330 may be allocated for a single ring entry, and that action must occur during that corresponding time interval. In contrast, an allocated dynamic action field 320 contains a pointer to a queue of dynamic actions 340 representing actions which become current, that is, ready for processing, during that time slot. Because static actions always take precedence, a dynamic action allocated a particular ring entry might not be processed during that time slot. Therefore, the presence of a dynamic action at a particular ring entry indicates that the action may be processed immediately or as soon as possible afterwards.

Dynamic actions, suitable for cell transmission on ABR and UBR circuits, are not preallocated. Typically, only one dynamic action for a particular virtual circuit will be allocated on timing ring 300 at any one time. When that action is processed, the next cell transmission for that circuit will be scheduled by placing an action 340 on the dynamic action queue at the ring entry 305 corresponding to the earliest slot for transmission of that cell. This procedure will be described in more detail below. Because dynamic actions are scheduled in real-time, there is no intrinsic limit to the timing resolution for these actions. However, the length of timing ring 300 does determine the minimum rate at which cells may be transmitted.

Figure 4:
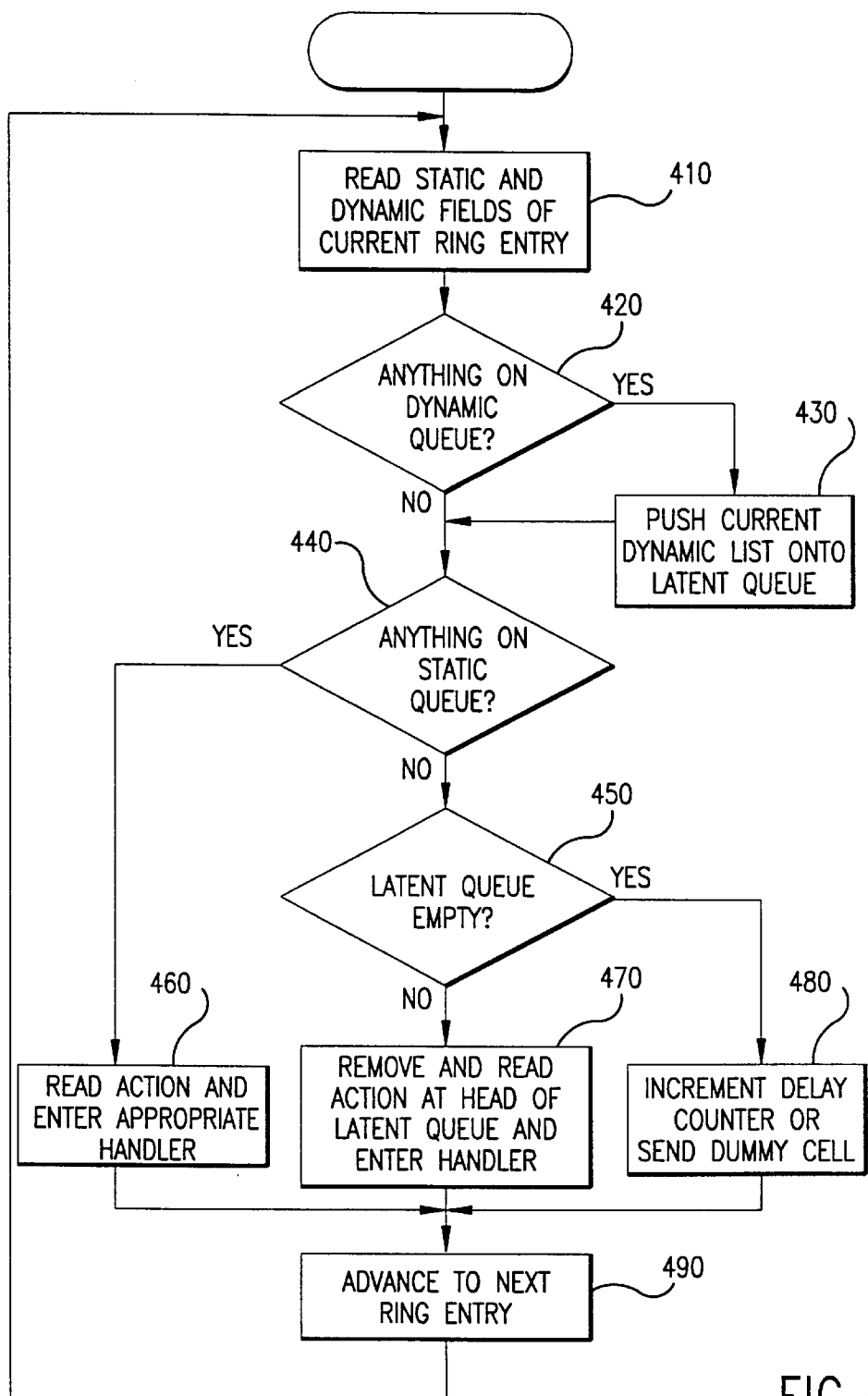
FIG. 4 is a flow diagram of a timing ring processing algorithm employed in the pacing mechanism of FIG. 1.

FIG. 4 represents an overall flow diagram for the processing by microprocessor 120 of ring entries on timing ring 300. Processing of the timing ring 300 according to this algorithm is initiated in response to hardware timer interrupt 185, shown in FIG. 1. As microprocessor 120 can process and queue cells in FIFO buffer 140 much faster than they are physically transmitted onto the network, normally several entries are processed in a burst, rather than handling a single entry per actual time interval. This implementation reduces the fixed penalty overhead of entering and leaving the interrupt code. The maximum number of entries which may be processed per burst is limited by the maximum length of FIFO buffer 140.

Microprocessor 120 continually maintains a pointer to the "next" ring entry 305, that is, the next entry to be processed. After receiving interrupt 185, microprocessor 120 will read both the static and dynamic fields of this current ring entry 305, as represented by block 410. Microprocessor 120 first checks the dynamic field 320, block 420, to determine if it contains a pointer to a queue of dynamic actions which have now become current. If so, microprocessor 120 moves to block 430, where that entire queue of dynamic actions is placed into another data structure known as the Latent Queue.

The Latent Queue is the mechanism by which all dynamic actions which have become current are queued for processing. As queues of dynamic actions are encountered in current ring entries, they are appended to the Latent Queue. The first action in the Latent Queue will be processed at the first ring entry for which there is no valid static action present, that is, when static field 310 is set to NULL. Dynamic actions are only processed from the Latent Queue; a dynamic action's presence on timing ring 300 simply indicates the moment at which that action may be moved to the Latent Queue and enabled for processing.

First-in, first-out (FIFO) list structures, as will be recognized by those of ordinary skill in the art, require special case handling for the first entry added to a list, and require both "head" and "tail" pointers to be maintained. With this additional overhead, manipulation of FIFO queues is a potentially slow operation for any processor. To avoid this overhead, the queues of dynamic actions maintained at each ring entry are singly-linked last-in, first-out (LIFO) queues, rather than FIFO queues. This arrangement requires lower overhead because all queue "add" and "remove" operations are performed at the queue head, requiring only a single pointer to be maintained.

The use of LIFO queues, however, results in local unfairness; queued actions are not processed in a strict "first come, first served" basis. To redress this, the Latent Queue is maintained as a FIFO stack which can guarantee long-term fairness. As entries on the ring are processed, any dynamic action LIFO queues that are encountered are pushed onto the FIFO Latent Queue exactly as found. In other words, the FIFO Latent Queue contains LIFO queues of actions. Of course, other implementations of these queues are possible, but this arrangement yields a minimum of processor overhead.

Regardless of whether or not a dynamic action queue was encountered and pushed onto the Latent Queue, microprocessor 120 will determine if a static action is present for that ring entry, as indicated in block 440. This is actually a two-part test. First, if static field 310 contains a NULL pointer, then no static action is scheduled for that time slot. However, it is also possible that a static action is scheduled for that time slot, e.g., the transmission of a cell on a particular CBR circuit, but that the application program employing that circuit has failed to supply the requisite data for transmission. Therefore, a check can be made to see if data is present. If no data is waiting, then the slot may be used for the processing of a dynamic action as if the slot had not been preallocated.

Figure 5:
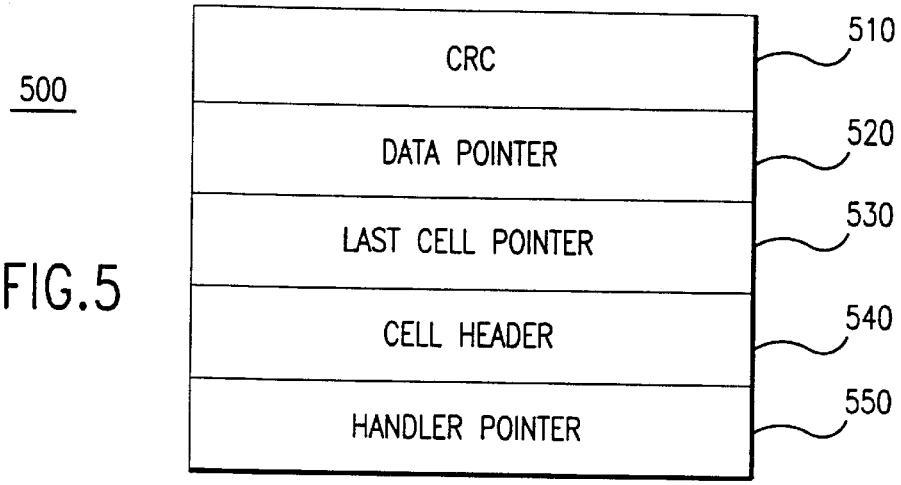
FIG. 5 is a diagram of a static action data structure employed in the pacing mechanism of FIG. 1.

If the ring entry is statically allocated, and if data is present to transmit, then microprocessor 120 steps to block 460 to read the action data structure indicated by the pointer in static action field 310. A typical static action data structure 500 is shown in FIG. 5. Microprocessor 120 will make a subroutine call to an action handler routine located in memory at the address specified by handler pointer 550. This cell transmission handler routine will create a single ATM cell by concatenating the four bytes (octets) of cell header 540 with 48 bytes (octets) of payload data (if a standard cell size is being employed) which is located in memory at the address specified by data pointer 520. The handler routine will then cause this ATM cell to be placed at the back of the transmit queue in FIFO buffer 140 to await transmission by transmission controller 150. The handler routine will then complete any other specified tasks and execute a subroutine return instruction to return control to the flow diagram of FIG. 4.

Figure 6:
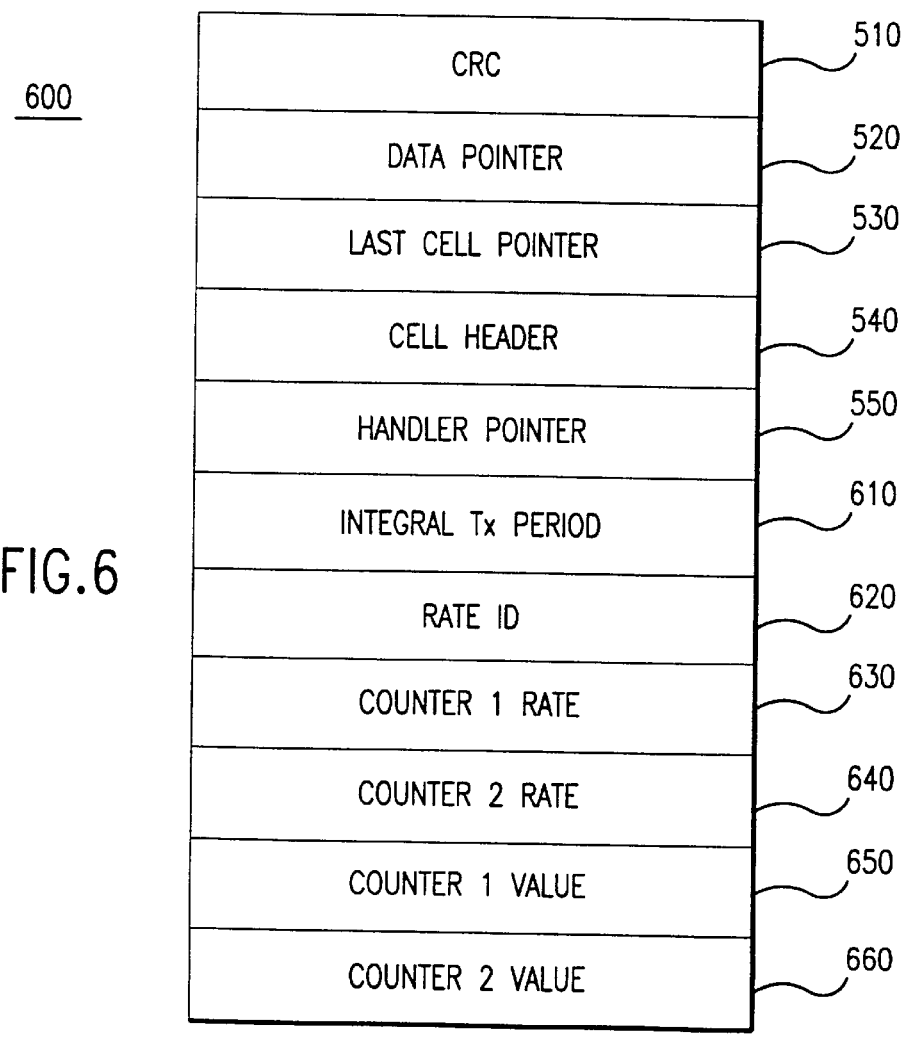
FIG. 6 is a diagram of a dynamic action data structure employed in the pacing mechanism of FIG. 1.

If microprocessor 120 determines at block 440 that static field 310 is not allocated, or that data is not waiting for an allocated field, microprocessor 120 will proceed to check the status of the Latent Queue, as represented in block 450. If at least one dynamic action is resident in the Latent Queue, microprocessor 120 will move to block 470 to read that action off the head of the Latent Queue. A typical dynamic action data structure 600 is shown in FIG. 6. The first five fields in dynamic action data structure 600 are identical to those contained in static action data structure 500. The additional fields shown in FIG. 6 are employed in scheduling subsequent dynamic actions for a particular virtual circuit and are described more fully below. As with static actions, microprocessor 120 will make a subroutine call to a action handler routine located in memory at the address specified by handler pointer 550. Again, this cell transmission handler routine will create a single ATM cell by concatenating the four bytes (octets) of cell header 540 with 48 bytes (octets) of payload data (if a standard cell size is being employed) which is located in memory at the address specified by data pointer 520. As before, this ATM cell will be placed at the back of the transmit queue in FIFO buffer 140 to await transmission by transmission controller 150. The handler routine will then schedule the next cell transmission for this virtual circuit by appending a dynamic action on timing ring 300 at the time slot representing the earliest time the next cell should be transmitted. The calculation of this interval will be described more fully below. The handler routine then completes any other specified tasks and executes a subroutine return instruction to return control to the flow diagram of FIG. 4.

If there is no static action to be implemented, and the Latent Queue is empty, microprocessor 120 will move from block 450 to block 480. This condition represents a time slot where no cell transmission should take place. However, since ring entries are processed in a burst, simply moving to next allocated ring entry and placing that cell in the transmit buffer would result in that next cell being transmitted too early. The simplest solution would be to construct a dummy ATM cell with VCI 250 set to zero and place that cell in FIFO buffer 140. This cell would be transmitted onto the network in due course by transmission controller 150. Its presence would occupy that transmission slot, thus ensuring that subsequent cells would be transmitted in their scheduled slots.

Such use of dummy cells is permissible, because an ATM network will automatically discard any cell containing a VCI 250 set to zero. However, this results in additional processing within the network which should be avoided if possible. Another, more efficient, mechanism is to employ an intelligent transmission controller 150 which can delay the transmission of a cell until its appointed transmission slot. This mechanism is implemented in the present invention by encoding a cell delay count in the Generic Flow Control (GFC) field 230 of each outgoing cell header. The value encoded in this field indicates to transmission controller 150 the number of cell times to wait before beginning transmission of that cell. Transmission controller 150 accomplishes this delay by monitoring cell delay timer 190, a timer signal which fires once per time slot.

Thus, after encountering an empty ring entry, microprocessor will increment a delay counter in block 480. This delay counter is always maintained and its current value is placed in GFC 230 of all constructed outgoing cells by the action handler routine. The action handler routine also resets the delay counter to zero when it places a newly-constructed cell into FIFO buffer 140 to await transmission.

Of course, GFC 230 consists of only four bits; thus, cell delay times between zero and fifteen (15) cell transmission times are possible. If microprocessor 120 increments the delay counter to sixteen (16) in block 480, it will reset the delay counter to zero, construct a dummy ATM cell, as described above, and place that cell in FIFO buffer 140 to await transmission.

Regardless of what tasks were performed in processing the current ring entry, microprocessor 120 will ultimately proceed to block 490 where it will advance to the next ring entry and loop around for processing. The actual physical incrementing of the pointer to the next ring entry may occur anywhere in the algorithm loop; in fact, it may be more efficient to advance the pointer when reading the entry at block 410. This step is shown at the bottom of the flow diagram of FIG. 4 for conceptual clarity.

The loop in the flow diagram of FIG. 4 is shown as perpetual for the sake of convenience. However, the processing will break out of this loop after it has processed a preset number of ring entries (or, possibly, loaded a preset number of cells into FIFO buffer 140). After breaking out, the processing will wait until it again receives timer interrupt 185 to resume processing ring entries. The preset number of ring entries and the frequency of timer interrupt 185 are implementation dependent, but these values should be chosen so that the transmission hardware is never left idle. In other words, FIFO buffer 140 should not be permitted to empty; rather the processing should be "topping off" ("topping up") the set of cells that the transmission hardware is trying to transmit. In this fashion, transmission controller 150 will always be transmitting cells or implementing cell transmission delays.

Figure 7:
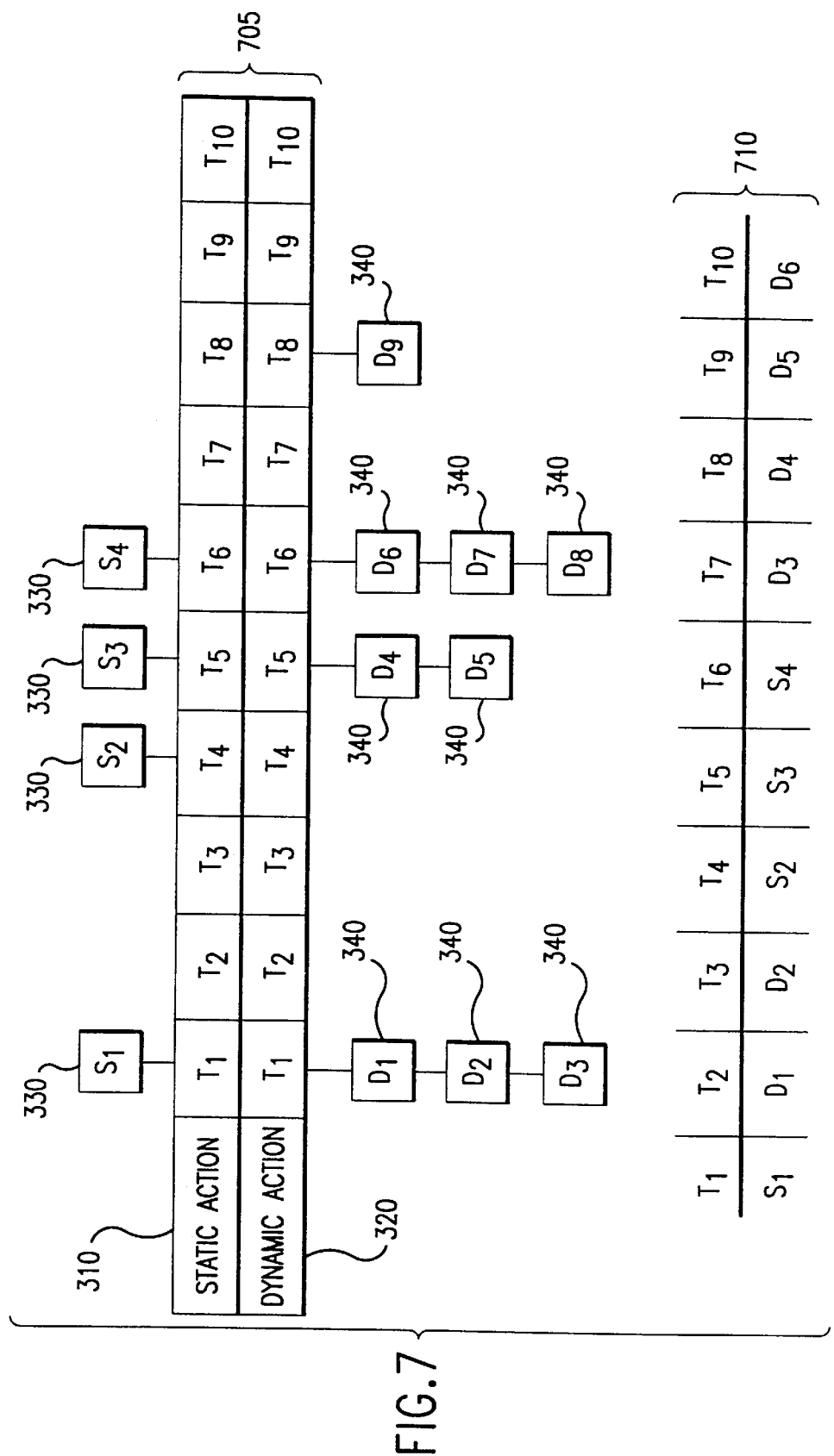
FIG. 7 is an example of the scheduling operation of the pacing mechanism of FIG. 1.

FIG. 7 presents an example of the scheduling mechanisms in operation, showing a window of ten time slots, $T_1$ to $T_{10}$. Timeline 710 shows which actions are performed in which time slots given the allocated timing ring 705. In time slot $T_1$ static action $S_1$ is performed and dynamic actions $D_1$, $D_2$ and $D_3$ are placed on the Latent Queue. Time slots $T_2$ and $T_3$ are unallocated, so the top two actions on the Latent Queue, $D_1$ and $D_2$, are performed in those time slots, respectively. Slots $T_4$, $T_5$ and $T_6$ are allocated for static actions $S_2$, $S_3$ and $S_4$, respectively, and these actions are performed in these time slots, while the dynamic queues allocated to slots $T_5$ and $T_6$ are placed on the Latent Queue. The top four actions on the Latent Queue, $D_3$ through $D_6$, are performed in slots $T_7$ through $T_{10}$. Note that although action $D_9$ is allocated to slot $T_8$, it is not performed in that time slot, but rather placed on the bottom of the Latent Queue. After slot $T_{10}$, actions $D_7$, $D_8$ and $D_9$ remain on the Latent Queue and will be performed subsequently.

As mentioned above, dynamic actions, used for ABR and UBR cell transmission, are allocated in real-time as cells from these virtual circuits are processed. When a dynamic action is handled, the action handler routine is charged with the task of scheduling the next dynamic action for that particular virtual circuit. The additional fields in the dynamic action data structure 600 enable the handler routine to perform this scheduling.

Scheduling information is stored as integral plus fractional time periods. The integral transmit period is stored in units of cell transmission times in Integral Tx Period 610, whereas the fractional period is stored as number of transmitted cells in Counter 2 Rate 640. The scheduling operates as follows: the action handler will place the next dynamic action at timing ring entry 305 X entries from the current ring entry, where X is defined by Integral Tx Period 610. However, every Y number of transmitted cells on that particular virtual circuit, where Y is defined by Counter 2 Rate 640, the dynamic action will either be placed at one additional or one less ring entry (depending on the implementation) from the one defined by Integral Tx Period 610. Therefore, fine grained control can be achieved over the transmission rate. Counter 2 Value 660 maintains the count of cells transmitted on that virtual circuit for comparison to Counter 2 Rate 640. This value is reset when the fractional transmit correction is performed.

Counter 1 Rate 630 defines the number of data cells to be transmitted on a particular ABR virtual circuit before an ABR Resource Management (RM) cell is transmitted. Counter 1 Value 650 maintains the actual cell count. When Counter 1 Value 650 reaches the value in Counter 1 Rate 630, the action handler will transmit an ABR RM cell rather than a data cell. In the preferred embodiment of the present invention, UBR virtual circuits are handled the same way as ABR circuits, but Counter 1 Rate 630 is set to zero so no RM cells are generated.

For ABR scheduling, the current transmission rate is also represented by Rate ID 620. Rate ID 620 is a sixteen (16) bit number which is linearly mapped over a range of rates which lie between one (1) cell per second and the line rate. As is known to those of ordinary skill in the art, the ATM Forum ABR specification requires both linear and exponential rate changes. These changes are handled by applying the linear or exponential rate change to Rate ID 620, and then using the newly-calculated value as an index to a look-up table to transform the result into an integral and fractional time period stored, respectively, in Integral TX Period 610 and Counter 2 Rate 640. For efficiency, ABR rate changes are normally applied only when an RM cell is transmitted, typically every thirty-two (32) data cells.

It should be recognized that the dynamic action data structure 600 may also be used for static actions. The counter fields may be used to implement transmit "gating", such that every 'N' of 256 allocated cell transmission slots are ignored. In other words, the static action handler will not transmit a cell in that slot. In this manner, fine-grained control over CBR rates, and implementation of VBR rate variability may be achieved.

Figure 8:
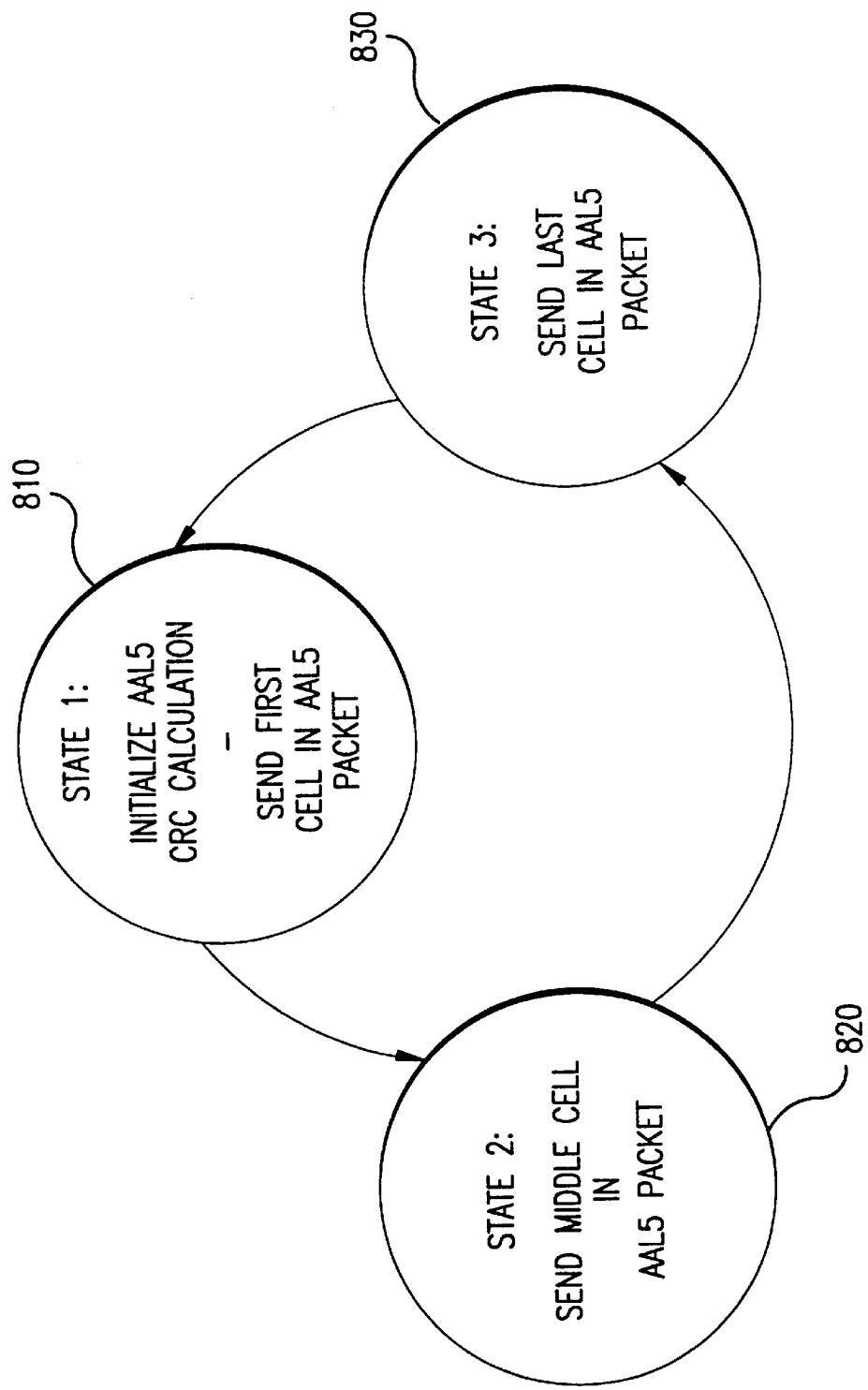
FIG. 8 is a diagram of a simplified state machine for AAL5 segmentation and transmission.

One of ordinary skill in the art will recognize that actions, together with their corresponding action handler routines, may be used to implement simple state machines. In fact, such a state machine is used to implement the integral plus fractional time period scheduling. As a further example, a simplified state machine for AAL5 segmentation and transmission (for multiple cell AAL5 packets) is shown graphically in FIG. 8. Once an AAL5 packet is presented by the application code for transmission, all fields in that virtual circuit's action data structure 500 (top half of structure 600) are initialized. In state 1 810, the action handler routine will initialize the AAL5 CRC calculation, send the first cell in the AAL5 packet, save the partial CRC residue in CRC 510 in the action data structure, schedule the next transmission if it is a dynamically scheduled circuit, and switch to the next state. When the next action is performed for that virtual circuit, the action handler routine will be in state 2 820. Here the handler routine will restore the CRC residue, send the next cell in the AAL5 packet, save the partial CRC residue in CRC 510, schedule the next transmission, and switch to the next state if the next cell is the last cell in the packet. This will be indicated when the updated data pointer 520 is equal to the value in last cell pointer 530. The action handler will remain in state 2 820 until this last cell is reached. In state 3 830, the action handler routine will restore the CRC residue, send the last cell in the AAL5 packet with the final computed CRC value, and return a transmitted completed status code to the application program. This type of state machine, as will be apparent to those of ordinary skill in the art, can be implemented for a wide variety of network operations.

It is also important to note that actions are not constrained to performing cell transmission; rather, virtually any processing function that needs to be scheduled for a particular moment in time may be implemented in an action handler routine and specified by an action pointer on timing ring 300. In fact, special "static" actions are predefined for software management tasks. For example, an action may be placed in timing ring 300 every fixed number of slots which causes microprocessor 120 to break out of the loop defined by the flow diagram of FIG. 4 and return from interrupt processing. In addition, the END marker 350 may be defined as an action which results in pointer address wrap-around to the start of timing ring 300. Nor do these management actions need to consume a physical time slot. Microprocessor 120 may simply move to the next ring entry 305 for processing any cells for transmission in that physical time slot.

Another possible use for a timing ring slot is the allocation of an action to return a "receive" buffer to an application program. Standard non-AAL5 traffic does not contain any end-of-packet marker; consequently, each received cell is typically passed directly to the application upon reception. This practice, however, incurs substantial processing overhead. Improved efficiency can be achieved by buffering several received cells and then passing those cells as a single block to the application.

However, because no packet structure can be inferred from the received traffic stream, a few cells could languish in a partially filled receive buffer. The timing ring can be used to schedule a action which guarantees return of the receive buffer at timely intervals, irrespective of the number of cells currently stored in the buffer. This mechanism provides an essential efficiency enhancement, while guaranteeing a maximum receive latency.

The above preferred embodiment of the present invention is a hybrid implementation, combining dynamic and static scheduling. This arrangement will provide appropriate tradeoffs between efficiency and flexibility for most network schemes. However, other embodiments are possible, and may be preferred for special network applications.

Figure 9:
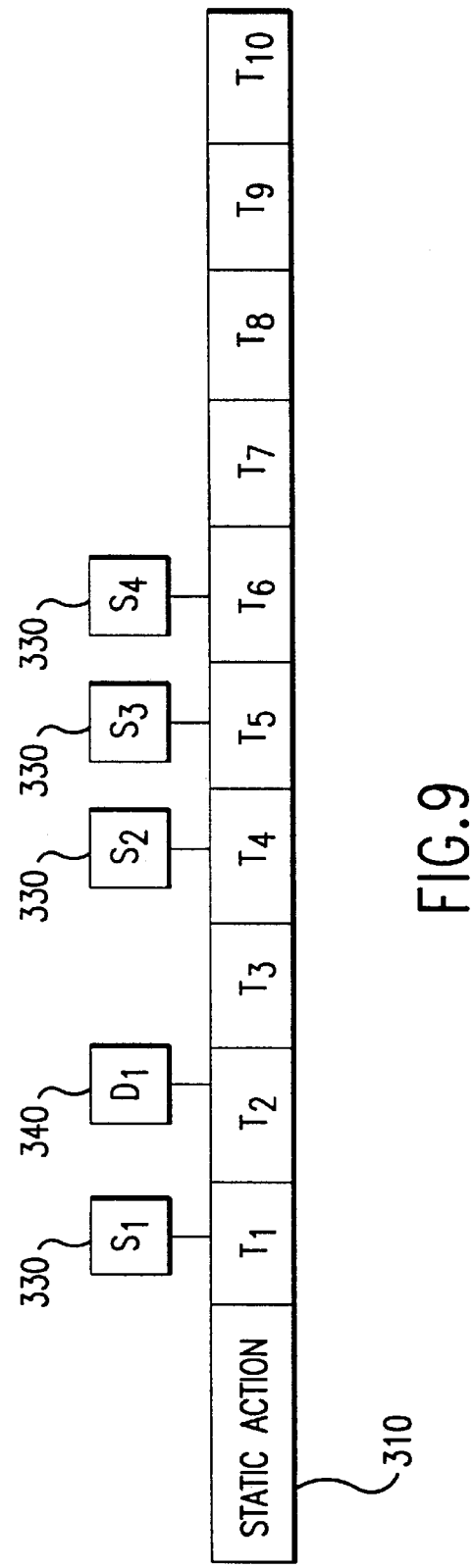
FIG. 9 is an illustration of a timing ring employed in a second embodiment of the pacing mechanism of FIG. 1.

A second embodiment consists of a timing ring 300 implementing static action handling only, as shown in FIG. 9. True static actions, such as CBR and real-time VBR cell transmissions, are statically preallocated at connection set-up time as above in the first embodiment. ABR cell transmissions may also be implemented by using a form of "pseudo-static" scheduling, that is, modifying the contents of the static fields 310 of timing ring 300 in real time. This occurs in the following manner: as shown in FIG. 9 a dynamic action is to be performed at time slot $T_2$. As this action is performed, the next action for that virtual circuit must be scheduled because it has not been statically preallocated. Assume that Integral Tx Period 610 indicates that this next action should ideally be scheduled for time slot $T_5$. However, because that time slot is already preallocated to static action $S_3$, the processor must linearly search from $T_5$ through timing ring 300 until a "free" time slot is found, here time slot $T_7$. The next dynamic action will be allocated to that slot.

This embodiment is suitable for network implementations consisting of many CBR and real-time VBR connections, but few simultaneous ABR transmitters. As the number of ABR transmitters increases, the length of the average ring search for scheduling increases, eventually making the processing overhead prohibitively expensive.

Figure 10:
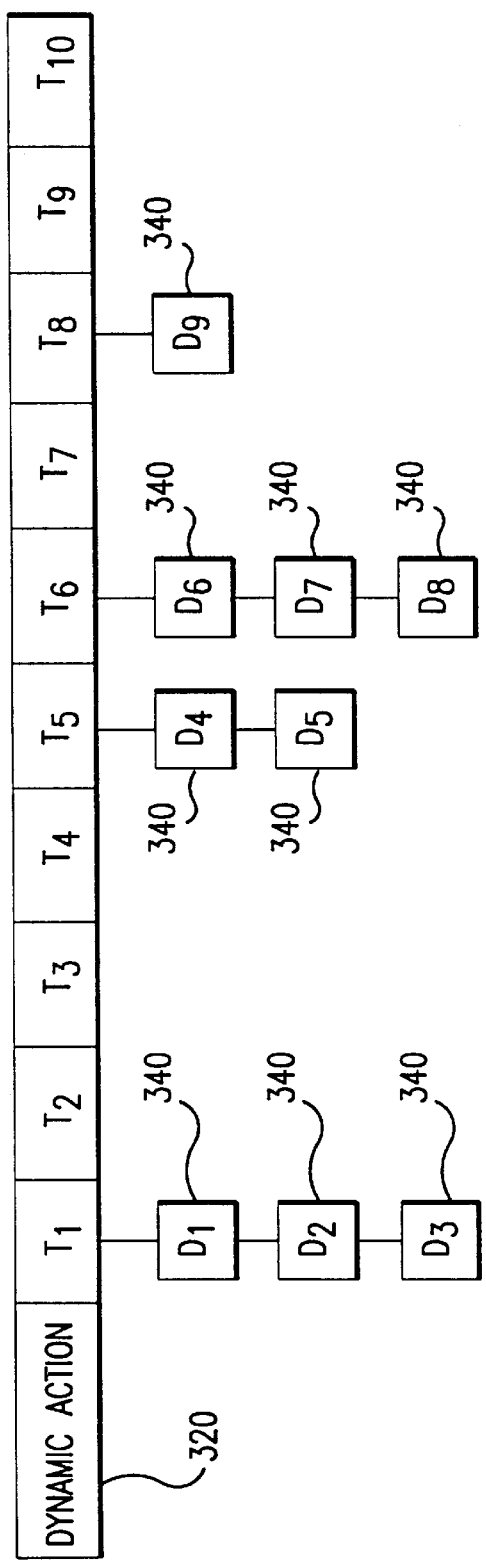
FIG. 10 is an illustration of a timing ring employed in a third embodiment of the pacing mechanism of FIG. 1.

A third embodiment consists of a timing ring 300 implementing dynamic scheduling only, as shown in FIG. 10. This scenario operates precisely as dynamic scheduling in the above hybrid implementation, though there are no statically preallocated time slots. At each ring entry, dynamic action queues are placed onto the Latent Queue and the action at the top of the Latent Queue is performed. This arrangement is preferred for network implementations consisting mainly of ABR, UBR and non-real time VBR traffic circuits.

Figure 11:
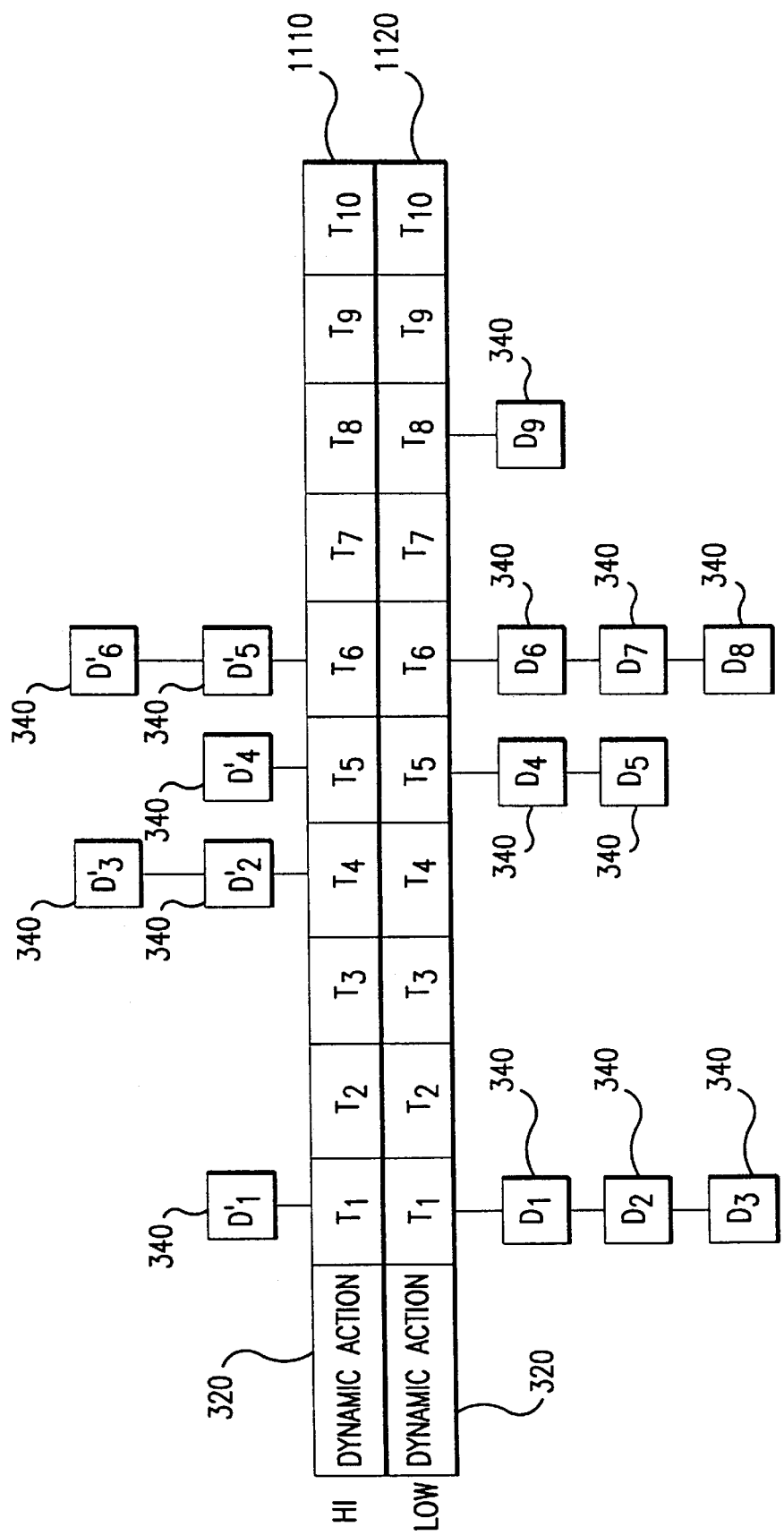
FIG. 11 is an illustration of a timing ring employed in a fourth embodiment of the pacing mechanism of FIG. 1.

A fourth embodiment consists of a timing ring 300 implementing dual dynamic scheduling, as shown in FIG. 11. The upper fields 1110 represent high-priority dynamic scheduling, whereas the lower fields 1120 represent low-priority dynamic scheduling. In this implementation, two Latent Queues are employed, one for high-priority traffic, another for low-priority traffic. All actions resident on the high-priority Latent Queue are performed before actions on the low-priority Latent Queue. This arrangement provides for better service guarantees than the single dynamic action handling embodiment, but performance will degrade with a large number of simultaneous transmitters.

Although the above description is with respect to the use of the present invention as a transmission pacing mechanism at end-points of an ATM network, those of ordinary skill in the art will understand that the present invention may also be employed at internal nodes, or switching nodes, of an ATM network. Such an application may be desirable to perform traffic shaping to correct pacing deviations created by idiosyncracies within the network itself.

It should be understood that various other modifications will also be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

We claim:

1. A method of schedulng the transmission of packets in a packet switching network, comprising:

allocating entries on at least one timing/ring for scheduling transmission of packets on one or more virtual circuits, wherein each entry on the at least one timing ring represents an available slot for scheduling transmission of a single packet, and wherein each entry comprises a static action field and a dynamic action field and;

sequentially processing the entries on the ring so as to transmit packets onto the network during their scheduled time slots or the first available time slot thereafter, wherein both the static action field and the dynamic action field are read to determine, for each entry, the actions to be performed for the scheduled transmission of packets.

2. The method according to claim 1 further comprising the step of preallocating entries on the timing ring for scheduling transmission of packets of one or more additional virtual circuits.

3. The method according to claim 2 wherein the processing step comprises placing packets into a transmit buffer to await transmission onto the network.

4. The method according to claim 3 wherein the dynamically allocating step occurs initially at virtual circuit establishment and thereafter when a packet scheduled by a dynamically allocated entry is placed into the transmit buffer.

5. The method according to claim 4 further comprising the step of delaying the transmission of a packet onto the network for a number of cell transmission times equivalent to the number of previous ring entries for which no packets were placed into the transmit buffer.

6. The method of claim 1, wherein the static action fields and dynamic action fields are on the same timing ring.

7. The method of claim 1, wherein the static action fields are on a first timing ring, and the dynamic action fields are on a second parallel timing ring.

8. The method of claim 1, wherein each field contains either a NULL pointer or an address pointer to a location in a data structure defining an action to be taken during the interval.

9. The method of claim 8, further comprising:

determining whether a static action is scheduled for a time slot;

if a static action is scheduled for the time slot, determining whether requisite data necessary to execute the static action is available; and if no static action is scheduled or if the requisite data is not available, executing a dynamic action during the time slot.

10. The method of claim 1, wherein only a single action is allocated to each static action field.

11. The method of claim 10, wherein the single action is performed during the time interval corresponding to the static action field to which the single action is assigned.

12. A packet transmission apparatus for scheduling the transmission of packets in a packet switching network, comprising:

at least one timing ring containing entries for scheduling transmission of packets on one or more virtual circuits, wherein each entry represents an available slot for scheduling transmission of a single packet, and wherein each entry comprises a static action field and a dynamic action field and;

a processor for sequentially processing the entries on the ring so as to transmit packets onto the network during their scheduled time slots or the first available time slot thereafter, wherein both the static action field and the dynamic action field are read to determine, for each entry, the actions to be performed for the scheduled transmission of packets.

13. The packet transmission apparatus of claim 12, wherein the static action fields and dynamic action fields are on the same timing ring.

14. The packet transmission apparatus of claim 12, wherein the static action fields are on a first timing ring, and the dynamic action fields are on a second parallel timing ring.

15. The packet transmission apparatus of claim 12, wherein each field contains either a NULL pointer or an address pointer pointing to a location in a data structure defining an action to be taken during the interval.

16. The packet transmission apparatus of claim 12, wherein the processor is adapted to:

determine whether a static action is scheduled for a time slot;

if a static action is scheduled for the time slot, determine whether requisite data necessary to execute the static action is available; and if no static action is scheduled or if the requisite data is not available, execute a dynamic action during the time slot.

17. The packet transmission apparatus of claim 12, wherein only a single action is allocated to each static action field.

18. The packet transmission apparatus of claim 12, wherein the single action is performed during the time interval corresponding to the static action field to which the single action is assigned.

19. The packet transmission apparatus of claim 12 wherein the timing ring includes entries preallocated for the scheduling of the transmission of packets of one or more additional virtual circuits.

20. The packet transmission apparatus of claim 19 wherein the packet switching network is an ATM network.

21. The packet transmission apparatus of claim 20 wherein the preallocated entries on the timing ring correspond to CBR or real-time VBR virtual circuits.

22. The packet transmission apparatus of claim 21 wherein the preallocated entries on the timing ring corresponding to a single virtual circuit are spaced at fixed integral intervals.

23. The packet transmission apparatus of claim 20 wherein the dynamically allocated entries on the timing ring correspond to ABR, UBR and non-realtime VBR virtual circuits.

24. The packet transmission apparatus of claim 23 wherein only one dynamically allocated entry per virtual circuit is present on the timing ring at any one time.

25. The packet transmission apparatus of claim 19 wherein an entry is dynamically allocated for a virtual circuit initially at connection set-up time and subsequently after a previously dynamically allocated entry for that virtual circuit has been processed.

26. The packet transmission apparatus of claim 25 wherein the next entry to be dynamically allocated for a virtual circuit is a fixed integral number of entries following the currently processed entry.

27. The packet transmission apparatus of claim 26 wherein the fixed integral number is modified by adding or subtracting one entry after a fixed number of packets on that virtual circuit have been transmitted.

28. The packet transmission apparatus of claim 35 wherein the next entry to be dynamically allocated for a virtual circuit is determined by moving a fixed integral number of entries following the currently processed entry and then linearly searching from that entry to find the first freely available entry.

29. The packet transmission apparatus of claim 19 wherein an entry on the timing ring may be both preallocated and dynamically allocated.

30. The packet transmission apparatus of claim 29 wherein a preallocated entry is represented by an action data structure specified by the corresponding static action field, and wherein a dynamically allocated entry is represented by a queue of action data structures specified by the corresponding dynamic action field.

31. The packet transmission apparatus of claim 30 wherein the processor processes an allocated ring entry by placing the queue of action data structures onto a latent queue, and if preallocated, by performing the action indicated by the action data structure specified by the static action field.

32. The packet transmission apparatus of claim 30 wherein the processor processes an allocated ring entry by placing the queue of action data structures onto a latent queue and by performing the action indicated by the action data structure at the head of the latent queue.

33. The packet transmission apparatus of claim 31 wherein the processor processes a ring entry which has not been preallocated by performing the action indicated by the action data structure at the head of the latent queue.

34. The packet transmission apparatus of claim 33 wherein the action is performed by an action handler routine specified by the action data structure.

35. The packet transmission apparatus of claim 34 wherein the action performed includes the placing of a packet corresponding to a virtual circuit into a transmit buffer to await subsequent transmission onto the network.

36. The packet transmission apparatus of claim 35, wherein the transmit buffer is not permitted to become empty.

37. The packet transmission apparatus of claim 35, wherein a dummy packet is placed in the transmit buffer when no packet transmission is specified for a ring entry.

38. The packet transmission apparatus of claim 35 wherein the transmission of the packet is delayed by a number of packet transmission times equivalent to the number of previous ring entries for which no packet transmission was specified.

39. The packet transmission apparatus of claim 38 wherein the number of packet transmission times is encoded in the header of the packet to be transmitted.

40. The packet transmission apparatus of claim 34 wherein the action handler routine implements a state machine such that state changes occur as subsequent actions corresponding to a single virtual circuit are performed.

41. The packet transmission apparatus of claim 40 wherein the state machine implements AAL5 segmentation and transmission.

42. The packet transmission apparatus of claim 12 wherein a dynamically allocated entry is represented by a queue of action data structures specified by the corresponding dynamic action field.

43. A packet transmission apparatus for scheduling the transmission of packets in a packet switching network, comprising at least one timing ring containing entries allocated for scheduling transmission of packets on one or more virtual circuits, wherein an entry on the timing ring represents an available time slot for scheduling transmission of a single packet; and a processor for processing the entries on the timing ring to transmit packets onto the network during their scheduled time slots, wherein the processor is adapted to read both a static action field and a dynamic action field for each entry, so as to determine, for each time slot, the action to be performed for the scheduled transmission of said packet; the static action field enabling packet transmission on a single virtual circuit on its scheduled time slot and having a priority over the dynamic action field, whereby the dynamic action field enables packet transmission on the first available time slot thereafter.

44. The packet transmission apparatus of claim 43, wherein the processor delays the transmission of a packet onto the network for a number of packet transmission times equivalent to the number of previous ring entries for which no packets were placed into the transmit buffer.

45. The packet transmission apparatus of claim 44, wherein the number of packet transmission times is encoded in the header of the packet to be transmitted.

46. The packet transmission apparatus of claim 43, wherein the dynamic action field enables transmission on ABR, UBR, and non-real-time VBR virtual circuits; and the static action field enables transmission on CBR and real-time VBR virtual circuits.

47. The packet transmission apparatus of claim 43, further including data storage means, and wherein each dynamic action field physically contains either a null pointer or an address pointer to a data structure stored in said storage means; the null pointer indicating that the timing slot has not been allocated for scheduling a dynamic action, whereby no action need be performed; the address pointer indicating a queue of dynamic actions which become current during the time slot.

48. The packet transmission apparatus of claim 47, wherein the queue of dynamic actions maintained for each entry is a singly linked last-in, first-out queue.

49. The packet transmission apparatus of claim 43, wherein the processor processes a dynamic action field by placing the queue of dynamic actions onto a latent queue.

50. The packet transmission apparatus of claim 49, wherein the processor processes a ring entry which has not been preallocated by performing the action at the head of the latent queue.

51. The packet transmission apparatus of claim 50, wherein the action is performed by an action handler routine.

52. The packet transmission apparatus of claim 51, wherein the action handler routine implements a state machine such that state changes occur as subsequent actions corresponding to a single virtual circuit are performed.

53. The packet transmission apparatus of claim 52, wherein the state machine implements AAL5 segmentation and transmission.

54. Apparatus for scheduling transmission of packets on one or more virtual circuits in an ATM packet switching network, the apparatus comprising:
a timing ring for static and dynamic entries,
said static entries being made for preallocated static cell scheduling for use with CBR and real-time VBR virtual circuits,
said dynamic entries being made for dynamic cell scheduling for use with ABR, UBR, and non real-time VBR circuits, and
said ring simultaneously accomodating the static and dynamic entries at correspondingly scheduled time slots so that, when each time slot is reached, either the static or dynamic entry or both can be processed in order to transmit cells onto the network during their scheduled time slots; and
processing means for processing, in a burst, a sequence of said entries on the respective time slots, said processing means being operative such that:
(a) said static entries always cause the transmission of cells at allocated time slots, so that fixed transmission intervals are maintained for CBR and real-time VBR traffic, and
(b) said dynamic queued entries form a linked list at a single scheduled time slot, said linked list is moved from said ring to a latent queue when said scheduled slot is reached, so that the latent queue can then be further processed, in a LIFO manner, in order to transmit each cell on said network, said further processing being such that, as each cell is transmitted on the network, the next cell transmission time is calculated and is added to the entries on said ring at the respective time slot, whereby said dynamic cell scheduling occurs at said scheduled time slot or during the next available time slot thereafter, whereby said ABR and non real-time VBR traffic is dynamically scheduled.

55. A method for scheduling transmission of packets on one or more virtual circuits in an ATM packet switching network, the method employing a timing ring for static and dynamic entries, said static entries being made for preallocated static cell scheduling for use with CBR and real-time VBR virtual circuits, and said dynamic entries being made for dynamic cell scheduling for use with ABR, UBR, and non real-time VBR circuits, said method comprising:
simultaneously accommodating on said ring the static and dynamic entries at correspondingly scheduled time slots so that, when each time slot is reached, either the static entry or dynamic entry or both can be processed in order to transmit cells onto the network during their scheduled time slots; and
processing, in a burst, a sequence of said entries on the respective time slots, such that:
(a) said static entries always cause the transmission of cells at allocated time slots, so that fixed transmission intervals are maintained for CBR and real-time VBR traffic, and
(b) said dynamic queued entries form a linked list at a single scheduled time slot, said linked list is moved from said ring to a latent queue when said scheduled slot is reached, so that the latent queue can then be further processed, in a LIFO manner, in order to transmit each cell on said network, said further processing being such that, as each cell is transmitted on the network, the next cell transmission time is calculated and is added to the entries on said ring at the respective time slot, whereby said dynamic cell scheduling occurs at said scheduled time slot or during the next available time slot thereafter, whereby said ABR and non real-time VBR traffic is dynamically scheduled.

* * * * *